(12) United States Patent
Hakamada

(10) Patent No.: US 9,251,448 B2
(45) Date of Patent: Feb. 2, 2016

(54) IMAGE PROCESSING APPARATUS INCLUDING EXPANSION MEMORY

(71) Applicant: RISO KAGAKU CORPORATION, Minato-ku, Tokyo (JP)

(72) Inventor: Junichi Hakamada, Tsukuba (JP)

(73) Assignee: RISO KAGAKU CORPORATION, Minato-ku, Tokyo (JP)

(*) Notice: Subject to any disclaimer, the term of this patent is extended or adjusted under 35 U.S.C. 154(b) by 0 days.

(21) Appl. No.: 14/508,836

(22) Filed: Oct. 7, 2014

(65) Prior Publication Data

US 2015/0116747 A1 Apr. 30, 2015

(30) Foreign Application Priority Data

Oct. 24, 2013 (JP) .................................. 2013-221206

(51) Int. Cl.
*G06F 3/12* (2006.01)
*G06K 15/02* (2006.01)

(52) U.S. Cl.
CPC ........ *G06K 15/1886* (2013.01); *G06K 15/1851* (2013.01); *G06K 15/1852* (2013.01); *G06K 15/1889* (2013.01)

(58) Field of Classification Search
CPC ........... G06T 1/60; G06F 3/122; G06F 3/124; G06F 3/1248; G06F 3/1212; G06F 3/1244; G06F 3/1247; G06K 15/1822; G06K 15/1861; G06K 15/1888; G06K 15/1851; G06K 15/1857

USPC ......................................... 358/1.16, 1.13, 518
See application file for complete search history.

(56) References Cited

U.S. PATENT DOCUMENTS

| | | | |
|---|---|---|---|
| 2005/0094191 A1* | 5/2005 | Vondran et al. .............. | 358/1.15 |
| 2007/0242297 A1 | 10/2007 | Eki | |
| 2008/0285074 A1* | 11/2008 | Wilson ......................... | 358/1.15 |
| 2012/0224208 A1 | 9/2012 | Tokumoto | |
| 2013/0342873 A1* | 12/2013 | Hiroshi ........................ | 358/1.16 |

FOREIGN PATENT DOCUMENTS

| | | | |
|---|---|---|---|
| JP | 2007282027 A | 10/2007 | |
| JP | 2009053841 A | 3/2009 | |
| JP | 2012183704 A | 9/2012 | |
| JP | 2013028098 A | 2/2013 | |

* cited by examiner

*Primary Examiner* — Benny Q Tieu
*Assistant Examiner* — Juan M Guillermety
(74) *Attorney, Agent, or Firm* — Holtz, Holtz & Volek PC

(57) ABSTRACT

An image processing apparatus includes: an interpreter processing part for creating intermediate data by analyzing a page description language; a rasterize processing part for creating RIP image data for each band for dividing each page into a plurality of parts, on the basis of the intermediate data; a characteristic value calculating part for calculating a characteristic value of RIP image data and associating the calculated characteristic value with the corresponding RIP image data; and an expansion processing part for, when the RIP image data whose characteristic value agrees with that of RIP image data that is a target for expansion are stored in a cache, reading out the RIP image data whose characteristic value agrees, the RIP image data being stored in the cache, and storing the RIP image data in an expansion memory.

16 Claims, 10 Drawing Sheets

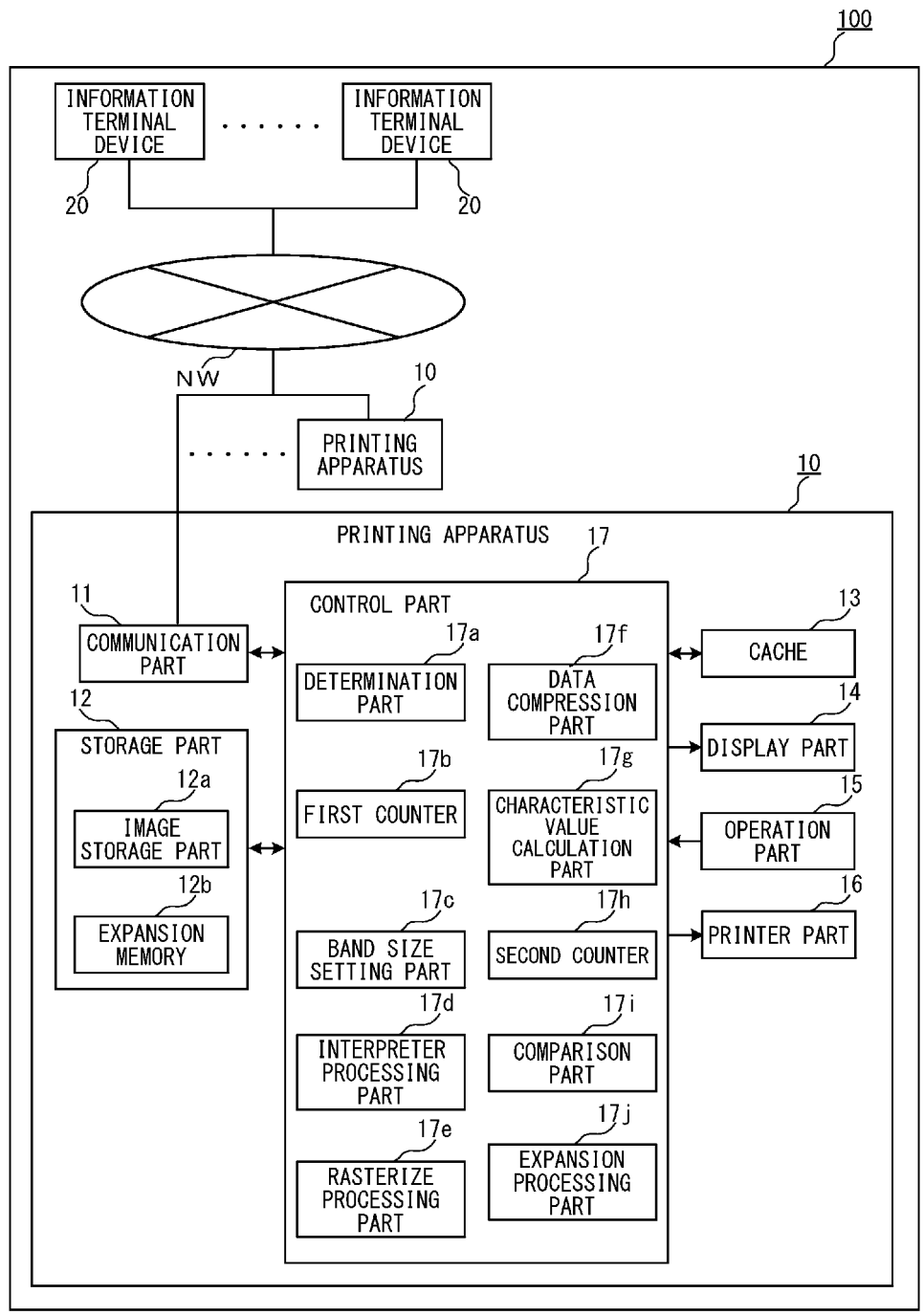
F I G. 1

| RIP IMAGE DATA (COMPRESSED DATA) | CHARACTERISTIC VALUE |
|---|---|
| P1-B1 | UN1 |
| P1-B2 | UN2 |
| P1-B3 | UN3 |
| P1-B4 | UN4 |
| P2-B1 | UN1 |
| P2-B2 | UN5 |
| P2-B3 | UN6 |
| P2-B4 | UN4 |
| ⋮ | ⋮ |

F I G. 2

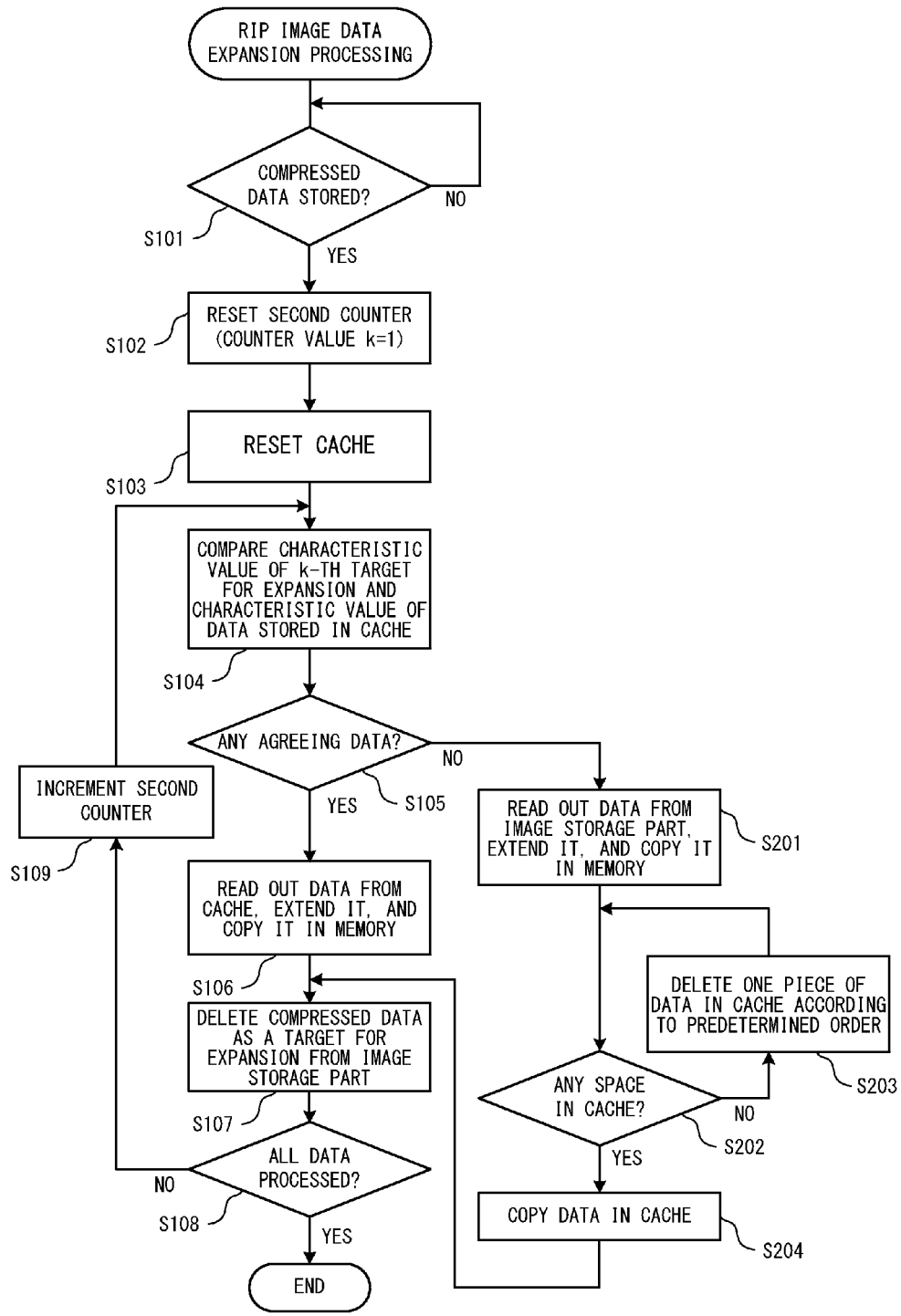
F I G. 4

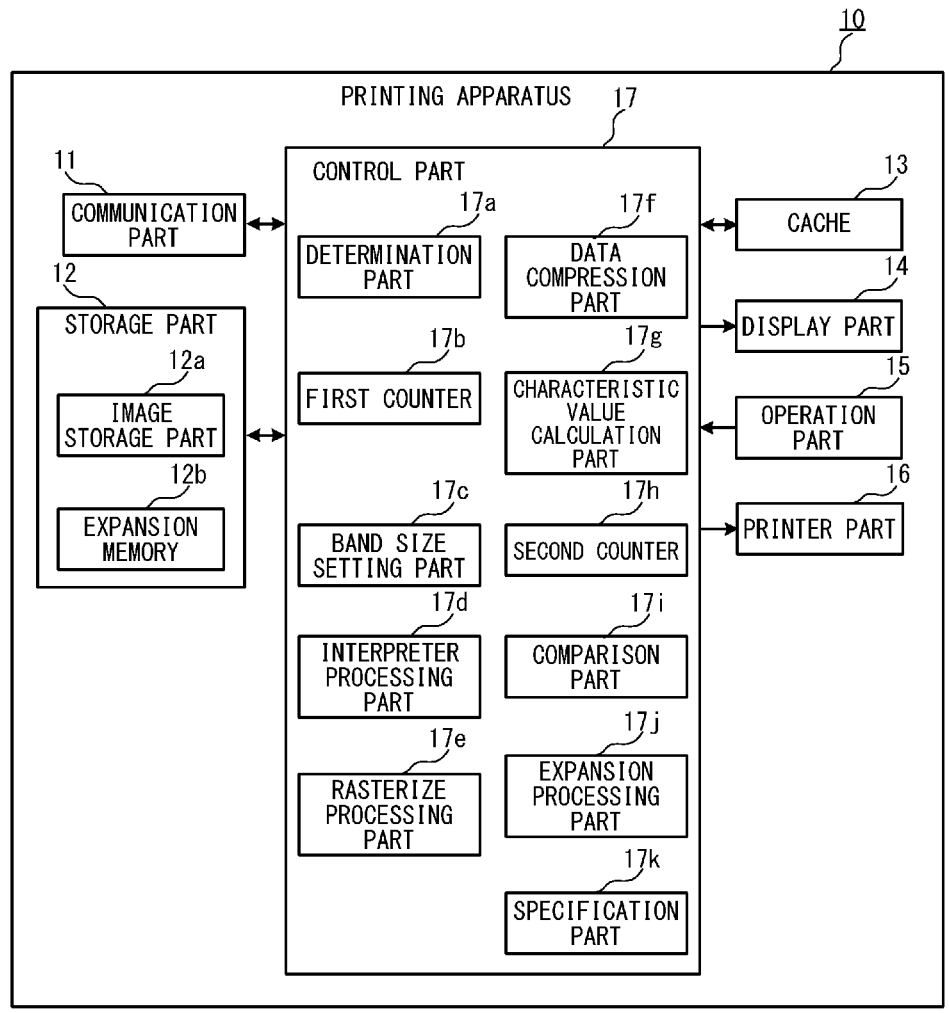
F I G. 6

| RIP IMAGE DATA (COMPRESSED DATA) | CHARACTERISTIC VALUE |
|---|---|
| P1-01 | UN7 |
| P1-02 | UN8 |
| P1-03 | UN9 |
| P2-B1 | UN1 |
| P2-B2 | UN5 |
| P2-B3 | UN6 |
| P2-B4 | UN4 |
| ⋮ | ⋮ |

F I G. 7

FIXED DATA (FORMAT DATA)

IMAGE PROCESSING APPARATUS INCLUDING EXPANSION MEMORY

CROSS-REFERENCE TO RELATED APPLICATIONS

This application is based upon and claims the benefit of priority of the prior Japanese Patent Application No. 2013-221206, filed on Oct. 24, 2013, the entire contents of which are incorporated herein by reference.

FIELD

The embodiments discussed herein are related to image processing apparatuses.

BACKGROUND

A technology for printing a large number of pages at a high speed by merging a plurality of pieces of variable data with format data which is frequently used (hereinafter referred to as variable printing) is known. In order to perform this variable printing more efficiently, job data for printing is described in a page description language (hereinafter referred to as a PDL.)

Among such PDLs, some include a function (hereinafter referred to as a cache function) to store data (hereinafter referred to as RIP image data) obtained by converting format data which is frequently used into a raster image by subjecting the format data to drawing processing (hereinafter referred to as RIP (Raster Image Processor) processing) in a cache (For example, see Patent Document 1).

This cache function enables the time required for RIP processing of the whole job to be shortened, by reading out RIP image data corresponding to format data from a cache when creating page data.

[Patent Document 1] Japanese Laid-open Patent Publication No. 2012-183704

SUMMARY

Page data (RIP image data) is output to a print engine so as to undergo print processing. Then, when RIP processing and expansion processing of the RIP image data to the print engine are operated non-synchronously, the RIP image data is temporarily stored in a secondary storage device such as an HDD (Hard Disk Drive). Then, the RIP image data is sequentially read out from the secondary storage device and stored in an expansion memory for expanding the RIP image data in the print engine.

Thus, in the conventional method, it is possible to shorten the time required for RIP processing, but it is impossible to shorten the time required for processing to expand RIP image data in an expansion memory from a secondary storage device which temporarily stores the RIP image data. Therefore, expansion processing from the secondary storage device is a bottleneck to speeding up of print processing.

In view of the above problem, one aspect is to provide an image processing apparatus capable of speeding up expansion of RIP image data in an expansion memory.

An image processing apparatus in an aspect includes an expansion memory for storing data to be expanded and output to a print engine for executing print processing, and includes: an interpreter processing part for creating intermediate data on the basis of job data that is a print target, the job data being described in a page description language; a rasterize processing part for creating RIP (Raster Image Processor) image data with respect to each band for dividing each page into a plurality of parts, on the basis of the intermediate data created by the interpreter processing part; an image storage part for temporarily storing RIP image data created by the rasterize processing part; a characteristic value calculating part for calculating a characteristic value which can uniquely distinguish the RIP image data and associating the calculated characteristic value with the corresponding RIP image data; an expansion processing part for storing RIP image data stored in the image storage part in the expansion memory; and a cache for temporarily holding RIP image data which has already been stored in the expansion memory, together with the corresponding characteristic value.

An expansion processing part compares the characteristic value of RIP image data that is a target to be stored in an expansion memory with the characteristic value of RIP image data stored in a cache before accessing an image storage part, and when the characteristic values agree, reads out RIP image data whose characteristic value agrees, the RIP image data being stored in a cache, so as to store the RIP image data in an expansion memory.

According to an image processing apparatus of an aspect, the characteristic value of RIP image data is calculated, and the calculated characteristic value and RIP image data are associated with each other so as to be stored in an image storage part (a secondary storage device). When expanding RIP image data in an expansion memory (a memory device) from an image storage part, if RIP image data whose characteristic value agrees with that of RIP image data that is a target for expansion exists in a cache, the image processing apparatus reads out the RIP image data whose characteristic value agrees from the cache so as to store the data in an expansion memory. In this manner, the read-out number from an image storage part as a secondary storage device can be reduced, and expansion processing of RIP image data can be sped up.

Also, according to an image processing device of an aspect, RIP image data is created in units of bands and processed to be expanded in units of bands. In this manner, the agreement rate can be increased, and the amount of data read out from an image storage part as a secondary storage device can be further reduced. Thus, expansion processing of RIP image data can be further sped up. Since RIP image data created in units of bands which are smaller in data size is stored in a cache, the cache can be more effectively utilized.

An image processing apparatus of another aspect includes an expansion memory for storing data to be expanded and output to a print engine for executing print processing, and includes: a specification part for specifying the number of pieces of object data arranged on a page with respect to each page, on the basis of job data that is a print target, the job data being described in a page description language; an interpreter processing part for creating intermediate data on the basis of the job data; a rasterize processing part for creating RIP (Raster Image Processor) image data with respect to each object data for the page in which the number of pieces of the object data specified by the specification part is less than a predetermined threshold value, and creating RIP image data with respect to each band for dividing each page into a plurality of parts, for the page in which the number of pieces of the object data is not less than the predetermined threshold value, on the basis of the intermediate data created by the interpreter processing part; an image storage part for temporarily storing RIP image data created by the rasterize processing part; a characteristic value calculating part for calculating a characteristic value which can uniquely distinguish the RIP image data and associating the calculated characteristic value with the corresponding RIP image data; an expansion processing part for storing RIP image data stored in the image storage part in the expansion memory; and a cache for temporarily holding RIP image data which has already been stored in the expansion memory, together with the corresponding characteristic value.

An expansion processing part compares the characteristic value of RIP image data that is a target to be stored in an expansion memory with the characteristic value of RIP image data stored in a cache before accessing an image storage part, and when the characteristic values agree, reads out the RIP image data whose characteristic value agrees, the RIP image data being stored in a cache, so as to store the RIP image data in an expansion memory.

According to an image processing apparatus of another aspect, the number of pieces of object data arranged in a page is specified with respect to each page, and when the number of pieces of specified object data is smaller than a predetermined value, RIP image data in units of object data is created. On the other hand, when the number of pieces of specified object data is not smaller than a predetermined value, an image processing apparatus creates RIP image data in units of bands. In this manner, the number of targets to be processed can be reduced.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram illustrating a configuration example of a print system in an embodiment 1 and a configuration example of a printing apparatus constituting the printing system.

FIG. 2 is a diagram illustrating an example of a correspondence relationship between compressed data stored in an image storage part and the characteristic value of the compressed data in embodiment 1.

FIG. 4 is an example of a flowchart for explaining a flow of RIP image data expansion processing in embodiment 1.

FIG. 6 is a functional block diagram illustrating a configuration example of a printing apparatus constituting a print system in an embodiment 2.

FIG. 7 is diagram illustrating an example of a correspondence relationship between compressed data stored in an image storage part and the characteristic value of the compressed data in embodiment 2.

DESCRIPTION OF EMBODIMENTS

Figure 3:
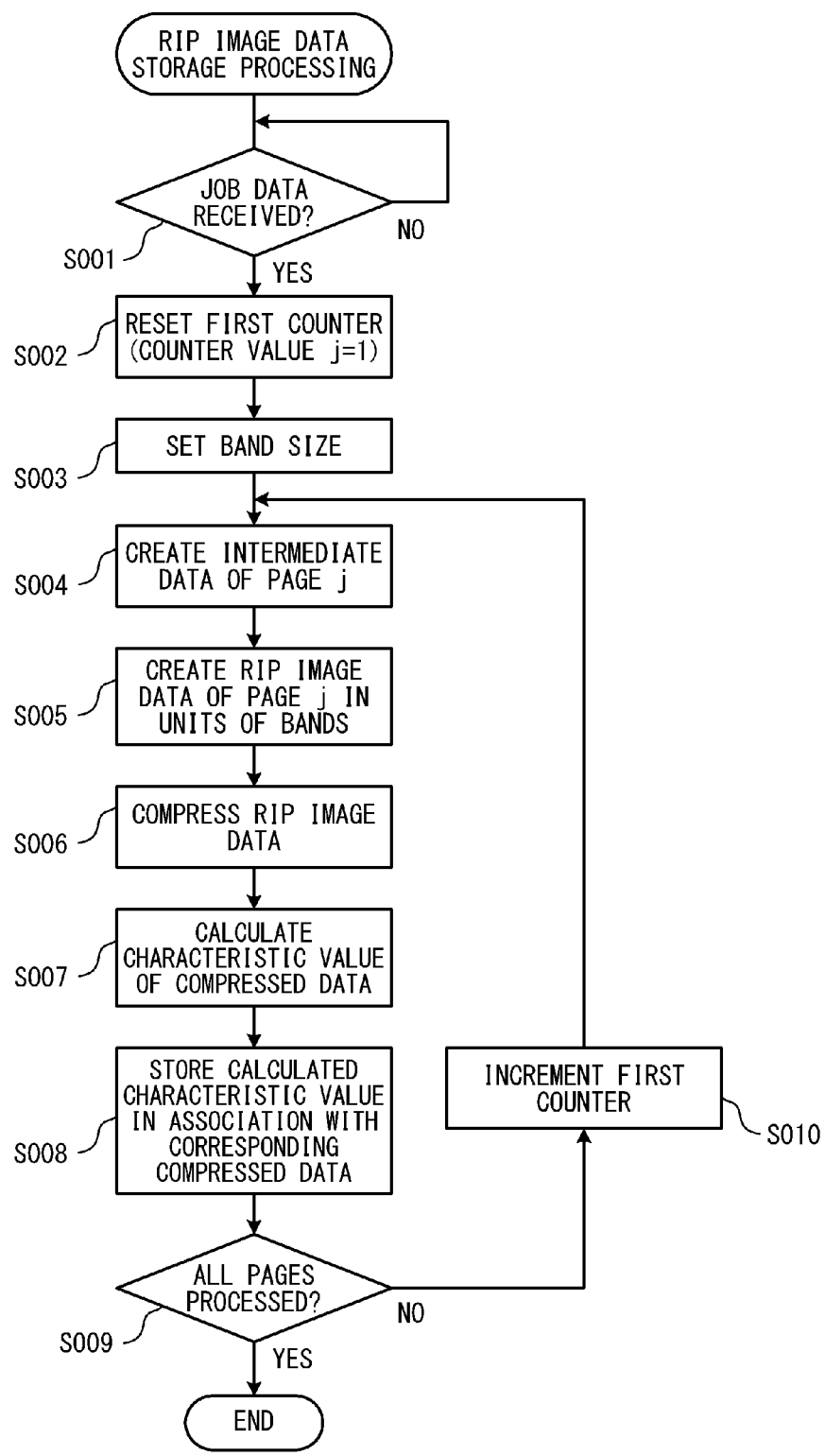
FIG. 3 is an example of a flowchart for explaining a flow of RIP image data storage processing in embodiment 1.

Hereinafter, embodiments of the present invention will be described in detail with reference to drawings.

An embodiment 1 will be described.

FIG. 1 is a functional block diagram illustrating a configuration example of a print system 100 in embodiment 1 and a configuration example of a printing apparatus 10 constituting the printing system 100. As illustrated in FIG. 1, the print system 100 includes one or a plurality of printing apparatus (es) 10, the printing apparatus 10 being an image processing apparatus, and one or a plurality of information terminal apparatus(es) 20, and the printing apparatus 10 and the information terminal apparatus 20 are connected so as to be able to communicate with each other through a network NW.

In embodiment 1, the following will be described under the assumption that job data output by the information terminal apparatus 20 and input to the printing apparatus 10 is described in a PDL.

The printing apparatus 10 processes job data output by the information terminal apparatus 20 to print the data on a printing medium such as paper and output it, and includes a communication part 11, a storage part 12, a cache 13, a display part 14, an operation part 15, a printer part 16, and a control part 17, as illustrated in FIG. 1.

The communication part 11 is constituted of a communication module or the like, and executes communication between the information terminal apparatus 20 and itself through the network NW. For example, the communication part 11 receives job data output by the information terminal apparatus 20.

The storage part 12 is constituted of a RAM (Random Access Memory), a ROM (Read Only Memory), an HDD, and the like, and functions as a work area for a CPU (Central Processing Unit) constituting the control part 17, a program area for storing various programs such as an operation program for controlling the whole of the printing apparatus 10, and a data area for storing various data such as an algorithm for calculating a characteristic value which will be described in detail hereinafter.

The storage part 12 also functions as an image storage part 12a and an expansion memory 12b, as illustrated in FIG. 1. The image storage part 12a is constituted of a secondary storage device such as an HDD, and stores RIP image data (hereinafter referred to as compressed data) created by a rasterize processing part 17e which will be described in detail hereinafter, and compressed by a data compression part 17f which will be described in detail hereinafter. The expansion memory 12b is constituted of a RAM or the like, and configured to output RIP image data to the printer part 16 to execute print processing.

The cache 13 is constituted of an SRAM (Static Random Access Memory) or the like, and stores compressed data read out from the image storage part 12a under the control of the expansion processing part 17j, which will be described in detail hereinafter.

The display part 14 is constituted of a display device or the like such as an LCD (Liquid Crystal Display) or organic EL (Electro-Luminescence), and displays, for example, image data and various function buttons on a display screen.

The operation part 15 is constituted of a numerical keypad and a touch panel displayed on the display screen of the display part 14, and a user can cause desired processing to be executed by operating the operation part 15 to input an instruction to the printing apparatus 10.

The printer part 16 is constituted of a print engine or the like, and executes print processing of each page on the basis of RIP image data expanded in the expansion memory 12b.

The control part 17 is constituted of a CPU or the like, executes an operation program stored in the program area of the storage part 12 to realize functions of a determination part 17a, a first counter 17b, a band size setting part 17c, an interpreter processing part 17d, a rasterize processing part 17e, a data compression part 17f, a characteristic value calculation part 17g, a second counter 17h, a comparison part 17i, and an expansion processing part 17j, and executes processing such as control processing to control the whole of the printing apparatus 10, and RIP image data storage processing and RIP image data expansion processing which will be described in detail hereinafter.

The determination part 17a determines whether or not job data has been received. The determination part 17a also determines whether or not storage processing of RIP image data has been executed for all the pages. More specifically, the determination part 17a determines whether or not the value of a counter value j of the first counter has reached the number of pages of a target for processing, to determine whether or not storage processing of RIP image data has been executed for all the pages.

In addition, the determination part 17a determines whether or not compressed data are stored in the image storage part 12a. The determination part 17a also determines whether or not compressed data having a characteristic value agreeing with the characteristic value of compressed data that is a target for expansion are stored in the cache 13, on the basis of the comparison result of the comparison part 17i.

In addition, the determination part 17a determines whether or not there is enough space to store compressed data that is a target for expansion in the cache 13, when storing compressed data read out by the expansion processing part 17j from the image storage part 12a, in the cache 13. More specifically, by determining whether or not the difference between the space of the cache 13 and the value obtained by summing up the data amount of respective pieces of compressed data stored in the cache 13 is not less than the data amount of the compressed data that is a target for expansion, the determination part determines whether or not there is space in the cache 13.

In addition, the determination part 17a determines whether or not expansion processing to all the compression data stored in the image storage part 12a has been executed. More specifically, by determining whether or not there is compressed data in the image storage part 12a, the determination part 17a determines whether or not expansion processing to all the compressed data stored in the image storage part 12a has been executed.

The first counter 17b is configured to manage whether or not storage processing of RIP image data to all the pages in job data that are a target for processing has been executed, and is controlled by the control part 17. The initial value of a counter value j of the first counter 17b is "1" in embodiment 1, and is incremented by the control part 17 when storage processing of all the RIP image data on a page (j-th page) that is a target for processing has been finished. That is, the number of the page that is a target for processing is associated with a counter value j of the first counter 17b.

Figure 5:
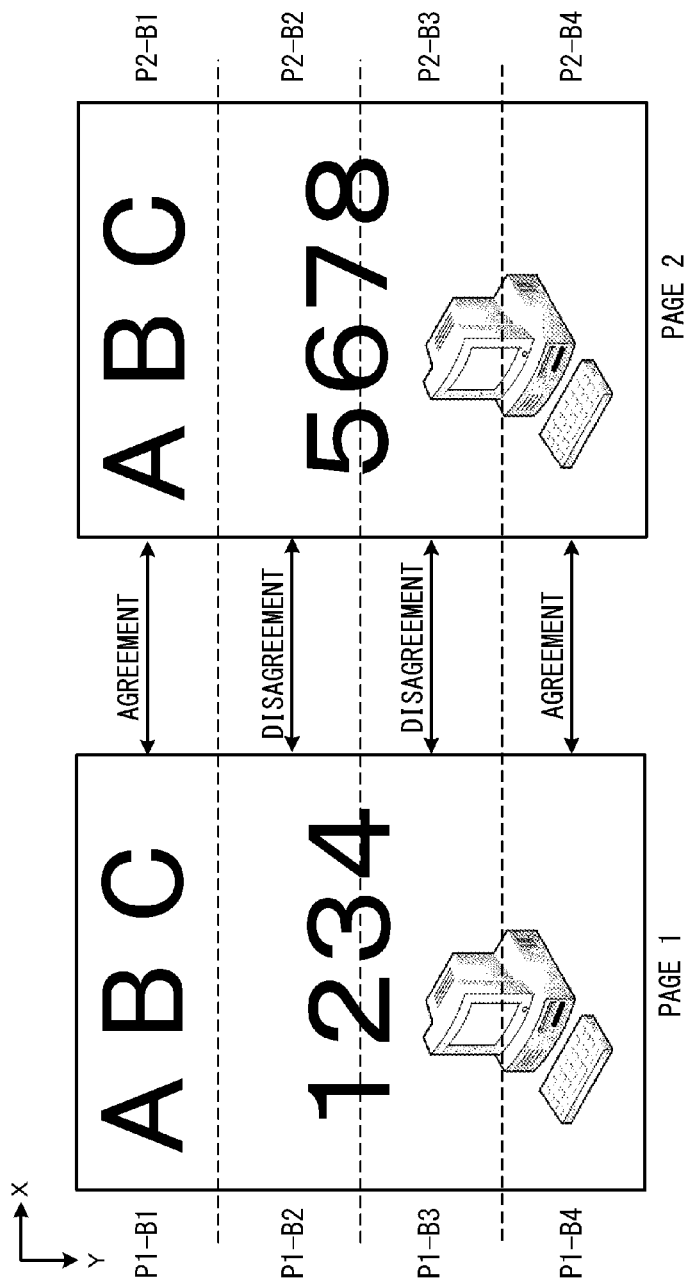
FIG. 5 is a diagram illustrating a specific example for specifically explaining the RIP image data expansion processing in embodiment 1.

The band size setting part 17c sets the size of a band for dividing a page that is a target for processing. The band size setting part 17c sets the size of a band on the basis of the size of, for example, a character (font). With reference to FIG. 5, the example of FIG. 5 is an example in which printing paper is divided into four bands in the Y-axis direction with the longitudinal direction of the paper set as the Y-axis direction.

Returning to FIG. 1, the interpreter processing part 17 analyses a PDL in which received job data is described, creates intermediate data with respect to each page, and stores the created intermediate data in the data area of the storage part 12.

The rasterize processing part 17e executes rasterize processing in units of bands in a band size set by the band size setting part 17c, on the basis of intermediate data created by the interpreter processing part 17d, to create RIP image data in units of bands. At that time, the rasterize processing part 17e executes image processing such as color conversion and halftone processing for adapting the RIP image data to the print engine constituting the printer part 16. Image processing such as color conversion and halftone processing for adapting the RIP image data to the print engine may be executed by the printer part 16.

The data compression part 17f compresses, in units of bands, RIP image data created by the rasterize processing part 17e to create compressed data in units of bands.

The characteristic value calculation part 17g calculates the characteristic value of compressed data created by the data compression part 17f, on the basis of an algorithm for calculating a characteristic value stored in the data area of the storage part 12. Then, the characteristic value calculation part 17g stores the calculated characteristic value in the image storage part 12a, in association with the corresponding compressed data. Here, a characteristic value is a value unique to compressed data, such as a hash value, a CRC (Cyclic Redundancy Check) value, and a checksum. That is, the fact that characteristic values calculated by the characteristic calculation part 17g agree with each other means that RIP image data corresponding to compressed data are identical.

FIG. 2 is a diagram illustrating an example of a correspondence relationship between compressed data stored in the image storage part 12a and the characteristic value of the compressed data in embodiment 1. "m" of Pm-Bn in FIG. 2 represents the number of the page, and "n" represents the order of the band from the upper end of the page. For example, with reference to FIG. 5, the third band from the upper end of page 1 is represented as P1-B3. Namely, "P1-B3" means compressed data of the third band from the upper end of page 1 in FIG. 2, and the example in FIG. 2 shows that the characteristic value of the compressed data of the third band from the upper end of page 1 is UN3.

Returning to FIG. 1, the second counter 17h is associated with compressed data that is a target for expansion, and is controlled by the control part 17. The initial value of a counter value k of the second counter 17h is "1" in embodiment 1, and is incremented by the control part 17 every time expansion processing of compressed data that is a target for expansion to the expansion memory 12b is executed.

In embodiment 1, processing is executed in ascending order of page numbers and in order from the upper end band of the page. For example, in the example of FIG. 2, compressed data is processed in order from compressed data of P1-B1. For example, compressed data of P2-B2 is processed as a target for expansion when the counter value k of the second counter 17h is "6."

The comparison part 17i compares the characteristic value of compressed data that is a target for expansion, the compressed data corresponding to a counter value k of the second counter 17h, with the characteristic value of compressed data stored in the cache 13.

The expansion processing part 17j executes processing to expand compressed data stored in the image storage part 12a in the expansion memory 12b. More specifically, when compressed data whose characteristic value agrees with that of compressed data that is a target for expansion are stored in the cache 13, the expansion processing part 17*j* reads out the compressed data stored in the cache 13 whose characteristic value agrees, extends the compressed data into the original RIP image data, and then stores the RIP image data in the expansion memory 12*b*. Then, the expansion processing part 17*j* deletes the compressed data that is a target for expansion from the image storage part 12*a*.

On the other hand, when compressed data whose characteristic value agrees with that of compressed data that is a target for expansion is not stored in the cache 13, the expansion processing part 17*j* reads out the compressed data that is a target for expansion from the image storage part 12*a*, extends the compressed data into the original RIP image data, and then stores the RIP image data in the expansion memory 12*b* and stores the read-out compressed data in the cache 13 in such a state that the compressed data is associated with the characteristic value.

At that time, when there is no space in the cache 13, the expansion processing part 17 deletes compressed data in the cache 13 in order until enough space to store the compressed data that is a target for expansion is secured, according to an existing algorithm of a cache.

Next, a flow of RIP image data storage processing in embodiment 1 will be described in reference to FIG. 3. FIG. 3 is an example of a flowchart for explaining a flow of RIP image data storage processing in embodiment 1. This RIP image data storage processing is started with a receipt of job data output by the information terminal apparatus 20 as a trigger.

The determination part 17*a* determines whether or not job data has been received (step S001). When the determination part 17*a* determines that the job data has not yet been received (step S001; NO), the processing of step S001 is repeated until the job data has been received.

On the other hand, when the determination part 17*a* determines that the job data has been received (step S001; YES), the control part 17 resets the first counter 17*b* (counter value j=1) (step S002), and the band size setting part 17*c* sets the size of a band (step S003).

Then, the interpreter processing part 17*d* analyses the PDL in which the received job data is described to create intermediate data of page j, and stores the created intermediate data in the data area of the storage part 12 (step S004).

Then, the rasterize processing part 17*e* executes rasterize processing in units of bands in which the size of the band is set by the band size setting part 17*c*, on the basis of the intermediate data created by the interpreter processing part 17*d*, to create RIP image data in units of bands (step S005).

Then, the data compression part 17*f* creates compressed data in units of bands, on the basis of the RIP image data created by the rasterize processing part 17*e* (step S006).

Then, the characteristic value calculating part 17*g* calculates the characteristic value of the compressed data created by the data compression part 17*f* (step S007), and stores the calculated characteristic value in the image storage part 12*a* in association with the corresponding compressed data (step S008).

Then, the determination part 17*a* determines whether or not storage processing of RIP image data has been executed for all the pages (step S009). When the determination part 17*a* determines that the processing has not yet been executed for all the pages (step S009; NO), the control part 17 increments the first counter 17*b* (step S010), processing is returned to the processing in step S004, and the above-mentioned processing is repeated.

On the other hand, when the determination part 17*a* determines that processing has been executed for all the pages (step S009; YES), this processing is terminated.

Next, a flow of RIP image data expansion processing in embodiment 1 will be described with reference to FIG. 4. FIG. 4 is an example of a flowchart for explaining the flow of RIP image data expansion processing in embodiment 1. This RIP image data expansion processing initiated by the compressed data having been stored in the image storage part 12*a* as a trigger.

The determination part 17*a* determines whether or not compressed data has been stored in the image storage part 12*a* (step S101). When the determination part 17*a* determines that compressed data has not been stored (step S101; NO), the processing in step S101 is repeated until compressed data has been stored in the image storage part 12*a*.

On the other hand, when the determination part 17*a* determines that compressed data has been stored (step S101; YES), the control part 17 resets the second counter 17*h* (counter value k=1) (step S102), and resets the cache 13 (step S103).

Then, the comparison part 17*i* compares the characteristic value of compressed data that is a target for expansion with the characteristic value of compressed data stored in the cache 13 (step S104). The determination part 17*a* determines whether or not compressed data whose characteristic value agrees with that of the compressed data that is a target for expansion is stored in the cache 13 on the basis of the comparison result of the comparison part 17 (step S105).

When the determination part 17*a* determines that compressed data whose characteristic value agrees with that of the compressed data that is a target for expansion are stored in the cache 13 (step S105; YES), the expansion processing part 17*j* reads out the compressed data stored in the cache 13 whose characteristic value agrees, extends the data, and then stores it in the expansion memory 12*b* (step S106). Then, the expansion processing part 17*f* deletes the compressed data that is a target for expansion from the image storage part 12*a* (step S107).

Here, in processing in step S105, when the determination part 17*a* determines that compressed data whose characteristic value corresponds to that of the compressed data that is a target for expansion is not stored in the cache 13 (step 105; NO), the expansion processing part 17*j* reads out the compressed data that is a target for expansion from the image storage part 12*a*, extends the data, and stores it in the expansion memory 12*b* (step S201).

Then, the determination part 17*a* determines whether or not there is enough space in the cache 13 to store the compressed data that is a target for expansion (step S202). When the determination part 17*a* determines that there is not enough space to store the compressed data that is a target for expansion (step S202; NO), the expansion processing part 17*j* deletes one piece of compressed data in the cache 13 in accordance with a predetermined order (step S203). The processing is returned to the processing in step S202, and the abovementioned processing is repeated.

On the other hand, when the determination part 17*a* determines that there is enough space to store the compressed data that is a target for expansion (step S202; YES), the expansion processing part 17*j* stores the compressed data that is a target for expansion in the cache 13 in such a state that they are associated with a characteristic value (step S204), and deletes the compressed data that is a target for expansion from the image storage part 12*a* (step S107).

Then, the determination part 17*a* determines whether or not expansion processing has been executed for all the compressed data stored in the image storage part 12*a* (step S108).

When the determination part 17a determines that expansion processing has not yet been executed for all the compressed data (step S108; NO), the control part 17 increments the second counter 17h (step S109), the processing is returned to the processing in step S104, and the abovementioned processing is repeated.

On the other hand, when the determination part 17a determines that expansion processing has been executed for all the compressed data (step S108; YES), this processing is terminated.

Next, a flow of RIP image data expansion processing in embodiment 1 will be described according to specific examples with reference to FIG. 2, FIG. 4, and FIG. 5. FIG. 5 is a diagram illustrating a specific example for specifically explaining the RIP image data expansion processing in embodiment 1. FIG. 5 illustrates the first page (hereinafter referred to as page 1) and the second page (hereinafter referred to as page 2) of a document that is a target for processing.

It is assumed that FIG. 2 illustrates the relationship between compressed data stored in the image storage part 12a and the characteristic value of the compressed data in this specific example. That is, as illustrated in FIG. 2 and FIG. 5, the characteristic values of compressed data P1-B1 on page 1 and compressed data P2-B1 on page 2 are in agreement with each other, UN1. The characteristic values of compressed data P1-B4 on page 1 and compressed data P2-B4 on page 2 are in agreement with each other, UN4.

In this specific example, the cache 13 can store all the compressed data P1-B1 to P1-B4 on page 1, and the data size of the compressed data P1-B2 is larger than the data size of the compressed data P2-B2. When the expansion processing part 17j deletes compressed data from the cache 13, compressed data are deleted in the order of timing at which the compressed data are referred to by the cache 13 from oldest.

When the compressed data in this specific example is stored in the image storage part 12a (step S101; YES), the control part 17 resets the second counter 17h (counter value k=1) (step S102) and resets the cache 13 (step S103).

Since no compressed data whose characteristic value agrees with the characteristic value UN1 of the compressed data P1-B1 that is a target for expansion is stored in the cache 13 (step S105; No), the expansion processing part 17j reads out the compressed data P1-B1 that is a target for expansion from the image storage part 12a, extends the data, and stores it in the expansion memory 12b (step S201).

Then, since there is space in the cache 13 (step S202; YES), the expansion processing part 17j stores the compressed data P1-B1 in the cache 13 (step S204), and deletes the compressed data P1-B1 from the image storage part 12a (step S107).

Since expansion processing has not yet been executed for all the compressed data (step S108; NO), the control part 17 increments the second counter 17h (step S109), and processing of the compressed data P1-B2 as the next target for expansion is started (step S104).

The same expansion processing as that executed for the compressed data P1-B1 is executed for the compressed data P1-B2 to P1-B4 on page 1, so that all the compressed data P1-B1 to P1-B4 on page 1 are stored in the cache 13.

Next, the second counter 17h is incremented (step S109), and when the counter value k=5, the compressed data P2-B1 on page 2 becomes a target for expansion. The characteristic value UN1 of the compressed data P2-B1 agrees with the characteristic value UN1 of the compressed data P1-B1 stored in the cache 13 (step S105; YES).

Therefore, the expansion processing part 17j reads out the compressed data P1-B1 whose characteristic value agrees from the cache 13, extends the data, and stores it in the expansion memory 12b (step S106). Then, the expansion processing part 17j deletes the compressed data P2-B1 that is a target for expansion from the image storage part 12a (step S107).

Since expansion processing has not yet been executed for all the compressed data (step S108; NO), the control part 17 increments the second counter 17h (counter value k=6) (step S109), and processing of the compressed data P2-B2 as the next target for expansion is started (step S104).

Since no compressed data whose characteristic value agrees with the characteristic value UN5 of the compressed data P2-B2 is stored in the cache 13 (step S105; NO), the expansion processing part 17j reads out the compressed data P2-B2 from the image storage part 12a, extends the data, and stores it in the expansion memory 12b (step S201).

Here, when there is not enough space to store the compressed data P2-B2 in the cache 13 (step S202; NO), the expansion processing part 17j deletes, from the cache 13, the compressed data P1-B2 oldest in a timing at which the data was referred to by the cache 13 (step S203). Since the data size of the compressed data P1-B2 is larger than the data size of the compressed data P2-B2 that is a target for expansion (step S202; YES), the expansion processing part 17j stores the compressed data P2-B2 in the cache 13 (step S204), and deletes the compressed data P2-B2 from the image storage part 12a (step S107).

Then, the same expansion processing is executed for the compressed data P2-B3, and the compressed data P2-B4 next becomes a target for expansion. Since the characteristic value UN4 of the compressed data P2-B4 agrees with the characteristic value UN4 of the compressed data P1-B4 stored in the cache 13 (step S105; YES), the expansion processing part 17j reads out the compressed data P1-B4 whose characteristic value agrees from the cache 13, extends the data, and stores it in the expansion memory 12b (step S106). Then, the expansion processing part 17j deletes the compressed data P2-B4 that is a target for expansion from the image storage part 12a (step S107).

Thus, expansion processing of RIP image data of each band on page 1 and page 2 has been finished, and processing to page 3 and thereafter will be executed.

Thus, when compressed data whose characteristic value agrees with that of compressed data that is a target for expansion is stored in the cache 13, the expansion processing part 17j processes the compressed data stored in the cache 13 to be expanded in the expansion memory 12b. On the other hand, when no compressed data whose characteristic value agrees with that of compressed data that is a target for expansion is stored in the cache 13, the expansion processing part 17j reads out the compressed data that is stored in the image storage part 12a and is a target for expansion, and processes the data to be expanded in the expansion memory 12b.

According to the above embodiment 1, the printing apparatus 10 calculates the characteristic value of RIP image data (compressed data), associates the calculated characteristic value with the RIP image data (compressed data), and stores them in the image storage part 12a. When expanding the RIP image data (compressed data) in the expansion memory 12b from the image storage part 12a, the printing apparatus 10 compares the characteristic value of the RIP image data (compressed data) that is a target for expansion with the characteristic value of the RIP image data (compressed data) stored in the cache 13. As a result of comparison, when the RIP image data (compressed data) whose characteristic value agrees exist in the cache 13, the RIP image data (compressed data) whose characteristic value agrees are read out from the cache 13, to be stored in the expansion memory 12b.

In this manner, the number of read-out times from the image storage part 12a that is a secondary storage device can be reduced, so that expansion processing of RIP image data can be sped up.

According to the above embodiment 1, the printing apparatus 10 divides each page into bands, creates RIP image data in units of bands, and processes the data to be expanded in units of bands. In this manner, the agreement rate between the RIP image data (compressed data) that is a target for expansion and the RIP image data (compressed data) stored in the cache 13 can be increased, and the amount of data read out from the image storage device 12a that is a secondary storage device can be further reduced. Since smaller sized RIP image data (compressed data) created in units of bands is stored in the cache 13, the cache 13 can be more effectively utilized.

According to the above embodiment 1, the printing apparatus 10 stores compressed data obtained by compressing RIP image data in the cache 13, and extends the compressed data when expanding it in the expansion memory 12b. In this manner, the cache 13 can be more effectively utilized, and the agreement rate can be increased more since more data can be stored in the cache 13. Thus, expansion processing of RIP image data can be sped up more.

Embodiment 2 will be described.

In embodiment 1, all pages are divided into bands, and RIP image data is created in units of bands. In embodiment 2, processing is executed while switching between creating RIP image data in units of bands and creating RIP image data in units of object data, according to the number of pieces of object data arranged on a page, with respect to each page. Here, the object data is image data of, for example, a photo area, an illustration area, and a character area.

FIG. 6 is a function block diagram illustrating a configuration example of a printing apparatus 10 constituting a print system 100 in embodiment 2. The basic configuration of the printing apparatus 10 in embodiment 2 is same as the case of embodiment 1. However, it is different from the case of embodiment 1 in that the control part 17 further includes a specification part 17k. In addition, functions of the determination part 17a, the interpreter processing part 17d, the rasterize processing part 17e, the data compressing part 17f, the characteristic value calculation part 17g, and the comparison part 17i are slightly different in the case of embodiment 1.

The control part 17 is constituted of a CPU or the like and executes an operation program stored in the program area of the storage part 12 to realize functions of the determination part 17a, the first counter 17b, the band size setting part 17c, the interpreter processing part 17d, the rasterize processing part 17e, the data compressing part 17f, the characteristic value calculation part 17g, the second counter 17h, the comparison part 17i, the expansion processing part 17j, and the specification part 17k, and executes processing such as control processing to control the whole of the printing apparatus 10, and RIP image data storage processing and RIP image data expansion processing which will be described in detail hereinafter.

The determination part 17a determines whether or not, apart from the processing described in embodiment 1, the number of pieces of object data on a page that is a target for processing, the number being specified by the specification part 17k, is a predetermined number (for example, 4) or more. In addition, the determination part 17a determines whether or not compressed data that is a target for expansion is compressed data of a band, on the basis of type discrimination information which will be described in detail hereinafter.

The interpreter processing part 17d analyses a PDL in which received job data is described when the number of pieces of object data on the page that is a target for processing is not less than a predetermined value, creates intermediate data of the page that is a target for processing, and stores the created intermediate data in the data area of the storage part 12.

On the other hand, when the number of object data on the page that is a target for processing is less than the predetermined value, the interpreter processing part 17d analyses a PDL in which received job data is described, creates intermediate data of the page that is a target for processing in units of object data, and stores the created intermediate data in units of object data in the data area of the storage part 12.

When the number of pieces object data on the page that is a target for processing is not less than a predetermined value, the rasterize processing part 17e executes rasterize processing in units of bands, in which the size of the band is set by the band size setting part 17c, on the basis of intermediate data created by the interpreter processing part 17d, to create RIP image data in units of bands. On the other hand, when the number of pieces object data on the page that is a target for processing is less than the predetermined value, the rasterize processing part 17e executes rasterize processing in units of object data and creates RIP image data in units of object data. At that time, the rasterize processing part 17e executes image processing such as color conversion and halftone processing for adapting the RIP image data to the print engine constituting the printer part 16. Image processing such as color conversion and halftone processing for adapting the RIP image data to the print engine may be executed by the printer part 16.

The data compression part 17f compresses RIP image data created by the rasterize processing part 17e in units of bands or in units of object data, to create compressed data in units of bands or in units of object data.

The characteristic value calculation part 17g calculates the characteristic value of compressed data created by the data compression part 17f, on the basis of an algorithm for calculating a characteristic value, the algorithm being stored in the data area of the storage part 12. Then, the characteristic value calculation part 17g stores the calculated characteristic value in the image storage part 12a in association with the corresponding compressed data. At that time, the characteristic value calculation part 17g adds type discrimination information capable of discriminating whether the compressed data corresponds to a band or corresponds to object data.

Here, FIG. 7 is a diagram illustrating an example of a correspondence relationship between compressed data stored in the image storage part 12a and the characteristic value of the compressed data in embodiment 2. In embodiment 2, as mentioned above, type discrimination information capable of discriminating whether compressed data corresponds to a band or corresponds to object data is added. In embodiment 2, compressed data corresponding to a band is represented as Pm-Bn, and compressed data corresponding to object data is represented as Pm-On. That is, in the example of FIG. 7, compressed data of page 1 are data compressed in units of object data and compressed data of page 2 are data compressed in units of bands.

Returning to FIG. 6, the comparison part 17i specifies compressed data corresponding to a band among compressed data stored in the cache 13 on the basis of type discrimination information when compressed data that is a target for expansion corresponds to a band, and compares the characteristic value of the specified compressed data with the characteristic value of the compressed data that is a target for expansion.

On the other hand, the comparison part 17i specifies compressed data corresponding to object data among compressed data stored in the cache 13 on the basis of type discrimination information when compressed data that is a target for expansion corresponds to object data, and compares the characteristic value of the specified compressed data with the characteristic value of the compressed data that is a target for expansion. That is, the comparison part 17i sets, as a target for comparison, compressed data of the same type as the compressed data that is a target for expansion, among the compressed data stored in the cache 13.

The specification part 17k analyses received job data, and specifies the number of pieces of object data arranged on a page that is a target for processing, on the basis of, for example, layout information representing a layout for each page.

Figure 8:
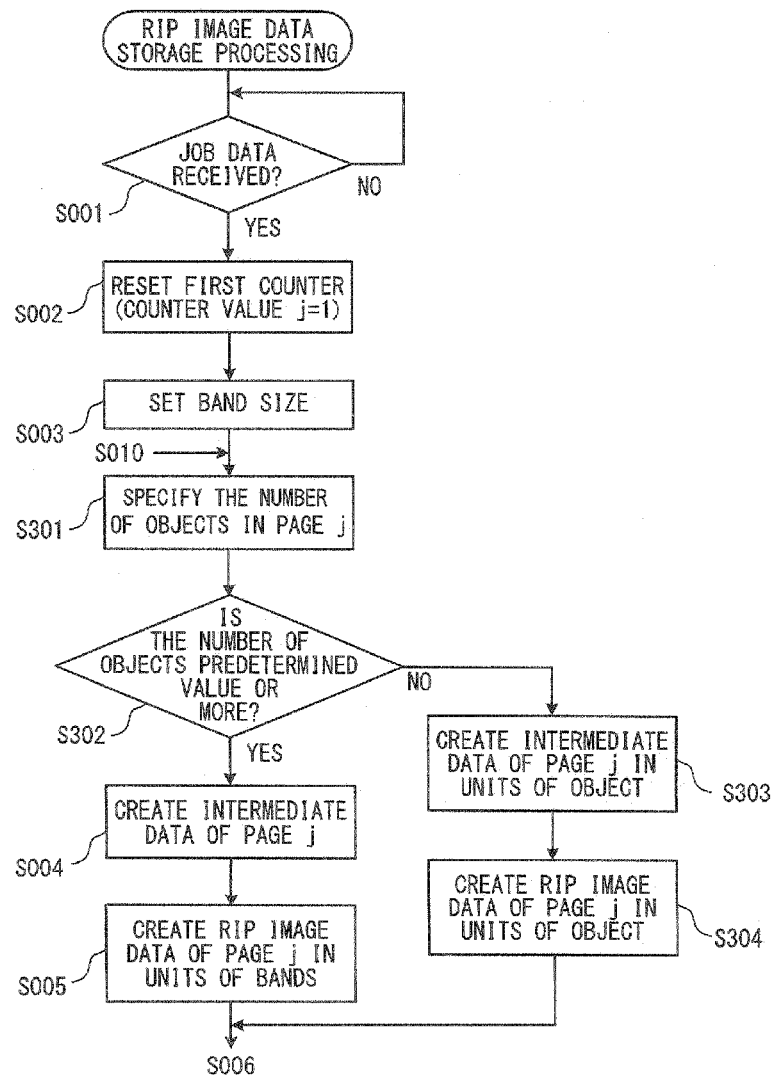
FIG. 8 is part of a flowchart for explaining a flow of RIP image data storage processing in embodiment 2.

Next, a flow of RIP image data storage processing in embodiment 2 will be described in reference to FIG. 8. FIG. 8 is part of an example of a flowchart for explaining the flow of RIP image data storage processing in embodiment 2. This RIP image data storage processing is started with a receipt of job data output by the information terminal apparatus 20 as a trigger.

The determination part 17a determines whether or not job data has been received (step S001). When the determination part 17a determines that the job data has not yet been received (step S001; NO), the processing of step S001 is repeated until the receipt of the job data.

On the other hand, when the determination part 17a determines that the job data has been received (step S001; YES), the control part 17 resets the first counter 17b (counter value j=1) (step S002), and the band size setting part 17c sets the size of a band (step S003).

Then, the specification part 17k specifies the number of pieces of object data arranged on page j that is a target for processing on the basis of the received job data (step S301), and the determination part 17a determines whether or not the number of pieces object data on page j that is a target for processing, the number being specified by the specification part 17k, is not less than a predetermined value (step S302).

When the determination part 17a determines that the number of pieces of object data on page j that is a target for processing is not less than the predetermined value (step S302; YES), the interpreter processing part 17d analyses a PDL in which the received job data is described, creates intermediate data of page j, and stores the created intermediate data in the data area of the storage part 12 (step S004).

Then, the rasterize processing part 17e executes rasterize processing in units of bands in which the size of the band is set by the band size setting part 17c in processing of step S003, on the basis of the intermediate data created by the interpreter processing part 17d, to create RIP image data in units of bands (step S005).

On the other hand, when the determination part 17a determines that the number of pieces object data on page j that is a target for processing is less than the predetermined value (step S302; NO), the interpreter processing part 17d analyses a PDL in which the received job data is described, creates intermediate data of page j in units of object data, and stores the created intermediate data in units of object data in the data area of the storage part 12 (step S303).

Then, the rasterize processing part 17e executes rasterize processing in units of object data, on the basis of the intermediate data created by the interpreter processing part 17d, to create RIP image data in units of object data (step S304).

Then, the data compression part 17f creates compressed data in units of bands when the RIP image data created by the rasterize processing part 17e is in units of bands, and creates compressed data in units of object data when the RIP image data is in units of object data (step S006).

Then, the characteristic value calculating part 17g calculates the characteristic value of the compressed data created by the data compression part 17f (step S007), and stores the calculated characteristic value in the image storage part 12a in association with the corresponding compressed data (step S008). At that time, the characteristic value calculating part 17g adds type discrimination information capable of discriminating whether the compressed data corresponds to a band or corresponds to object data.

Then, the determination part 17a determines whether or not storage processing of RIP image data has been executed for all the pages (step S009). When the determination part 17a determines that the processing has not yet been executed for all the pages (step S009; NO), the control part 17 increments the first counter 17b (step S010), processing is returned to the processing in step S301, and the abovementioned processing is repeated.

On the other hand, when the determination part 17a determines that processing has been executed for all the pages (step S009; YES), this processing is terminated.

Figure 9:
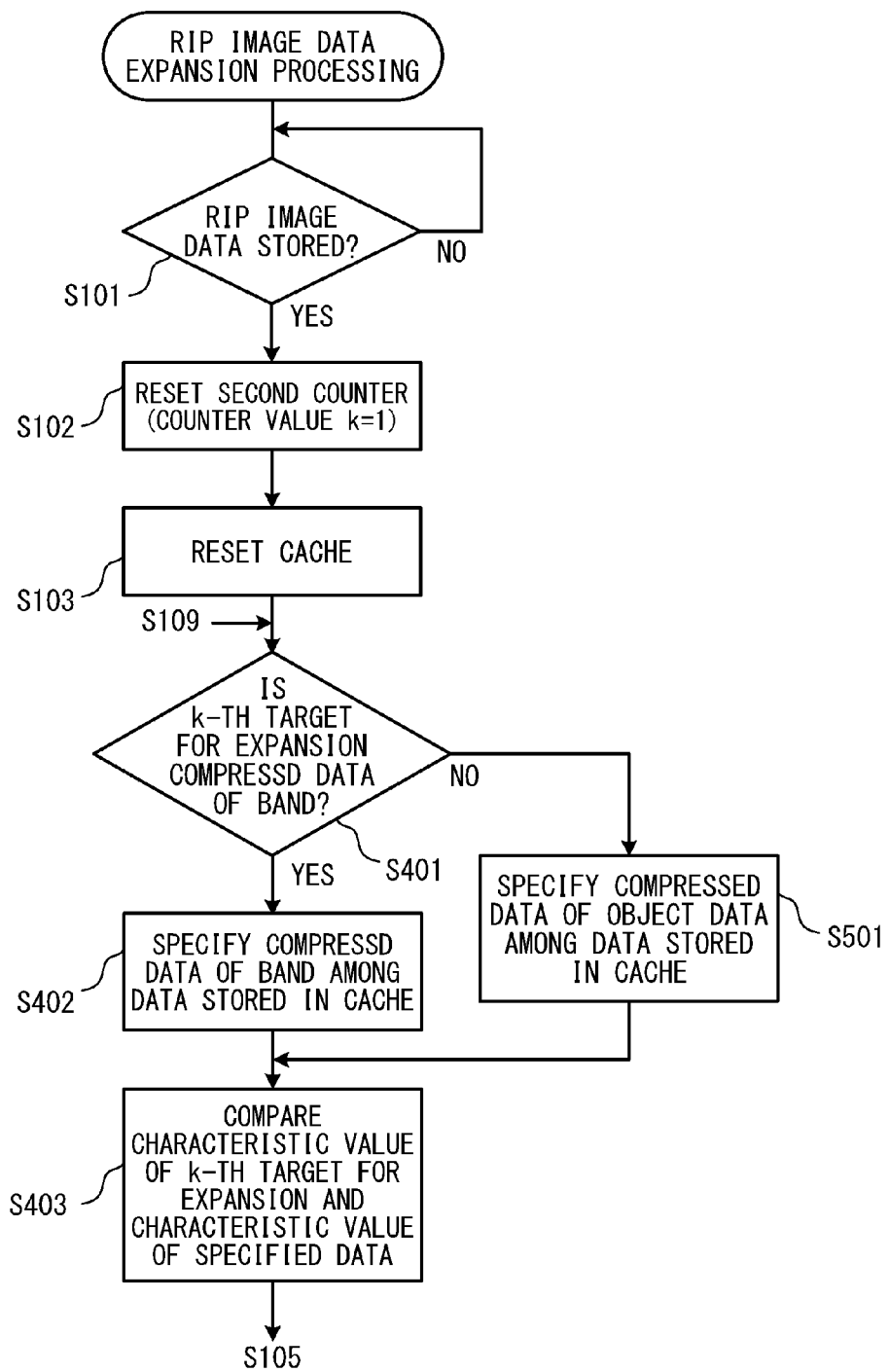
FIG. 9 is part of an example of a flowchart for explaining a flow of RIP image data expansion processing in embodiment 2.

Next, a flow of RIP image data expansion processing in embodiment 2 will be described with reference to FIG. 9. FIG. 9 is part of an example of a flowchart for explaining the flow of RIP image data expansion processing in embodiment 2. This RIP image data expansion processing is initiated by the compressed data having been stored in the image storage part 12a as a trigger.

The determination part 17a determines whether or not compressed data has been stored in the image storage part 12a (step S101). When the determination part 17a determines that the compressed data has not been stored (step S101; NO), the processing of step S101 is repeated until the compressed data has been stored in the image storage part 12a.

On the other hand, when the determination part 17a determines that the compressed data has been stored (step S101; YES), the control part 17 resets the second counter 17h (counter value k=1) (step S102), and resets the cache 13 (step S103).

Then, the determination part 17a determines whether or not compressed data that is a target for expansion is compressed data of a band, on the basis of type discrimination information (step S401). When the determination part 17a determines that the compressed data that is a target for expansion is compressed data of object data (step S401; NO), the comparison part 17i specifies the compressed data corresponding to the object data among compressed data stored in the cache 13, on the basis of type discrimination information (step S501), and processing proceeds to the aforementioned processing in step S403.

On the other hand, when the determination part 17a determines that the compressed data that is a target for expansion is compressed data of a band (step S401; YES), the comparison part 17i specifies the compressed data corresponding to a band among compressed data stored in the cache 13, on the basis of type discrimination information (step S402).

Then, the comparison part 17i compares the characteristic value of the specified compressed data with the characteristic value of the compressed data that is a target for expansion (step S403). The processing proceeds to the processing in step S105 described in embodiment 1. In embodiment 2, after the processing in step S109, processing is returned to the processing in step S401, and the abovementioned processing is repeated.

According to the above embodiment 2, the printing apparatus 10 specifies the number of pieces of object data arranged on a page, with respect to each page, and when the number of pieces of the specified object data is less than a predetermined value, creates RIP image data in units of object data. On the other hand, when the number of pieces of the specified object data is not less than the predetermined value, the printing apparatus 10 creates RIP image data in units of bands. In this manner, the amount of targets to be processed can be reduced.

In addition, according to the above embodiment 2, the printing apparatus 10 specifies as a target for comparison compressed data of the same type as that of the compressed data that is a target for expansion, from among compressed data stored in the cache 13, on the basis of type discrimination information. In this manner, targets for comparison can be narrowed down.

The above embodiments are applicable to the case when RIP processing and expansion processing of RIP image data to the print engine are executed non-synchronously, that is, the case in which the RIP image data is temporarily stored in the secondary storage device (image storage part 12a) to expand the RIP image data in the expansion memory 12b from the secondary storage device (image storage part 12a), as well as the case of variable printing.

In the above embodiments 1 and 2, the realizing of each function part of the control part 17 by executing the operation program is described; however, the embodiments are not limited to this. For example, part or the whole of the function part of the control part 17 may be realized by hardware (for example, a programmable logic device such as an FPGA (Field Programmable Gate Array)). In addition, for example, the rasterize processing part 17e may be realized by hardware.

In the above embodiment 1, when creating intermediate data, intermediate data may be created in units of bands.

In the above embodiments 1 and 2, the compressing of the RIP image data and the calculating of the characteristic value of the compressed data is described; however, the embodiments are not limited to this, and RIP image data may not be compressed. In this case, the characteristic value of the RIP image data may be calculated and the calculated characteristic value may be stored in the image storage part 12a in association with the corresponding RIP image data.

In addition, in the above embodiments 1 and 2, that the calculating of the characteristic value of compressed data is described; however, the embodiments are not limited to this, and for example, the characteristic value of RIP image data before being compressed may be calculated, and compressed data and the calculated characteristic value may be stored in the image storage part 12a while associating them with each other.

Figure 10A:
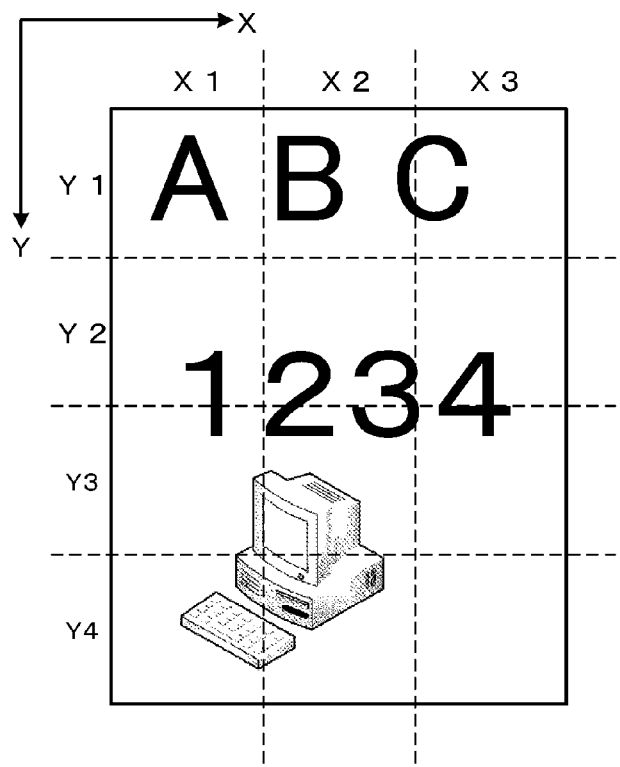
FIG. 10A and FIG. 10B each are diagrams illustrating another example of band division.

In addition, the method for band division is not limited to the band division in the Y-axis direction exemplified in FIG. 5. For example, band division may not be performed. For example, the method for band division may be band division in the X-axis direction, or may be band division in a lattice shape as illustrated in FIG. 10A.

Figure 10B:
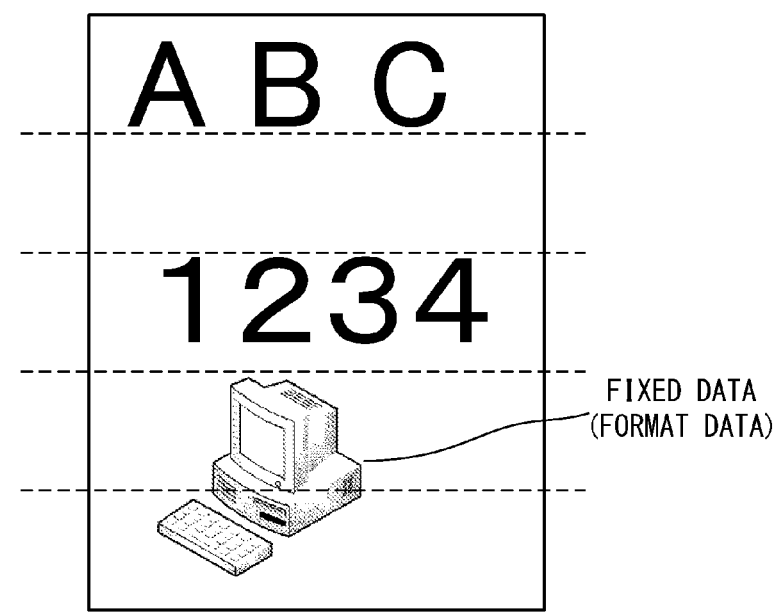

In the case of variable printing, band division may be performed in consideration of an arrangement of fixed data (format data). For example, as illustrated in FIG. 10B, when a figure of a PC (Personal Computer) is fixed data (format data), the band size of a band including the fixed data (format data) is set so that the band does not include variable data. In this manner, the effect of the cache can be increased. In addition, the band size of a band including fixed data (format data) and the band size of the other data may be set to be different from each other.

In addition, in the case of variable printing, RIP image data may be created in units of object data and RIP image data (compressed data) of fixed data (format data) may be stored in the cache 13. In this case, when the RIP image data (compressed data) of the fixed data (format data) is stored in the image storage part 12a, for example, fixed data information indicating that the data is fixed data (format data) may be added, and the expansion processing part 17j may store the RIP image data (compressed data) of the fixed data (format data) in the cache 13, on the basis of the fixed data information.

The abovementioned processing may be executed by storing the operation program for executing the above operation in a computer-readable recording medium such as a flexible disk, a CD-ROM (Compact Disk-Read Only Memory), a DVD (Digital Versatile Disk), an MO (Magneto Optical disk), to distribute the program, and installing it into a computer of the printing apparatus 10 etc. The program may be stored in a disk device or the like that a server device on the Internet has, and for example may be superimposed on a carrier wave for transmitting information, to be downloaded to a computer of the printing apparatus 10 etc.

Hereinbefore, the embodiments of the present invention have been described; however, the present invention is not limited to the embodiments described hereinbefore, and can take various configurations or embodiments within the scope not deviating from the gist of the present invention.

What is claimed is:

1. An image processing apparatus including an expansion memory for storing data to be expanded and output to a print engine for executing print processing, the image processing apparatus comprising:
    an interpreter processing part for creating intermediate data based on job data that is a print target, the job data being described in a page description language;
    a rasterize processing part for creating RIP (Raster Image Processor) image data with respect to each band for dividing each page into a plurality of parts, based on the intermediate data created by the interpreter processing part;
    an image storage part for temporarily storing RIP image data created by the rasterize processing part;
    a characteristic value calculating part for calculating a characteristic value which can uniquely distinguish the RIP image data and associating the calculated characteristic value with the corresponding RIP image data;
    an expansion processing part for expanding RIP image data stored in the image storage part and storing the expanded RIP image data in the expansion memory; and
    a cache for temporarily holding, together with the corresponding characteristic value, RIP image data which has not been expanded by the expansion processing part and which corresponds to RIP image data which has already been expanded and stored in the expansion memory,
    wherein, the expansion processing part compares a characteristic value of target RIP image data that is stored in the image storage part and that is a target to be stored in the expansion memory with a characteristic value of RIP image data stored in the cache before accessing the image storage part, and when the characteristic values agree, reads out and expands the RIP image data stored in the cache whose characteristic value agrees with the characteristic value of the target RIP image data stored in the image storage part, to store the expanded RIP image data in the expansion memory.

2. The image processing apparatus according to claim 1, wherein when the RIP image data stored in the cache is read out from the cache, expanded, and stored in the expansion memory, the expansion processing part deletes, from the image storage part, the RIP image data that was the target.

3. The image processing apparatus according to claim 2, further comprising a data compression part which compresses the RIP image data created by the rasterize processing part,
wherein the RIP image data stored in the image storage part and in the cache is compressed RIP image data compressed by the data compression part.

4. The image processing apparatus according to claim 1, wherein, when RIP image data having a characteristic value which agrees with the characteristic value of the target RIP image data is not stored in the cache, the expansion processing part (i) reads out and expands the target RIP image data from the image storage part and stores the expanded RIP image data in the expansion memory, (ii) stores, in the cache, the target RIP image data which is not expanded, together with the corresponding characteristic value, and (iii) deletes, from the image storage part, the RIP image data which was the target and which has been read out, expanded, and stored in the expansion memory and which has also been stored in the cache without being expanded.

5. The image processing apparatus according to claim 4, further comprising a data compression part which compresses the RIP image data created by the rasterize processing part,
wherein the RIP image data stored in the image storage part and in the cache is compressed RIP image data compressed by the data compression part.

6. The image processing apparatus according to claim 1, wherein when there is RIP image data to be stored in the cache and there is not enough space in the cache to store the RIP image data, the expansion processing part deletes, from the cache, a piece of RIP image data this is oldest in a timing at which the RIP image data was referred to by the cache.

7. The image processing apparatus according to claim 6, further comprising a data compression part which compresses the RIP image data created by the rasterize processing part,
wherein the RIP image data stored in the image storage part and in the cache is compressed RIP image data compressed by the data compression part.

8. The image processing apparatus according to claim 1, further comprising a data compression part which compresses the RIP image data created by the rasterize processing part,
wherein the RIP image data stored in the image storage part and in the cache is compressed RIP image data compressed by the data compression part.

9. An image processing apparatus including an expansion memory for storing data to be expanded and output to a print engine for executing print processing, the image processing apparatus comprising:
a specification part for specifying a number of pieces of object data arranged on a page with respect to each page, based on job data that is a print target, the job data being described in a page description language;
an interpreter processing part for creating intermediate data based on the job data;
a rasterize processing part for creating RIP (Raster Image Processor) image data with respect to each object data for a page in which the number of pieces of the object data specified by the specification part is less than a predetermined threshold value, and creating RIP image data with respect to each band for dividing each page into a plurality of parts, for a page in which the number of pieces of the object data is not less than the predetermined threshold value, based on the intermediate data created by the interpreter processing part;
an image storage part for temporarily storing RIP image data created by the rasterize processing part;
a characteristic value calculating part for calculating a characteristic value which can uniquely distinguish the RIP image data and associating the calculated characteristic value with the corresponding RIP image data;
an expansion processing part for storing RIP image data stored in the image storage part in the expansion memory; and
a cache for temporarily holding RIP image data which has already been stored in the expansion memory, together with the corresponding characteristic value,
wherein, the expansion processing part compares a characteristic value of target RIP image data that is stored in the image storage part and that is a target to be stored in the expansion memory with a characteristic value of RIP image data stored in the cache before accessing the image storage part, and when the characteristic values agree, reads outs the RIP image data stored in the cache whose characteristic value agrees with the characteristic value of the target RIP image data stored in the image storage part, to store the RIP image data in the expansion memory.

10. The image processing apparatus according to claim 9, wherein when the RIP image data stored in the cache is read out from the cache and stored in the expansion memory, the expansion processing part deletes, from the image storage part, the RIP image data that was the target.

11. The image processing apparatus according to claim 10, further comprising a data compression part which compresses the RIP image data created by the rasterize processing part,
wherein the RIP image data stored in the image storage part and in the cache is compressed RIP image data compressed by the data compression part.

12. The image processing apparatus according to claim 9, wherein, when RIP image data having a characteristic value which agrees with the characteristic value of the target RIP image data is not stored in the cache, the expansion processing part (i) reads out the target RIP image data from the image storage part and stores the target RIP image data in the expansion memory, (ii) stores, in the cache, the target RIP image data, together with the corresponding characteristic value, and (iii) deletes, from the image storage part, the RIP image data which was the target and which has been read out and stored in the expansion memory and which has also been stored in the cache.

13. The image processing apparatus according to claim 12, further comprising a data compression part which compresses the RIP image data created by the rasterize processing part,
wherein the RIP image data stored in the image storage part and in the cache is compressed RIP image data compressed by the data compression part.

14. The image processing apparatus according to claim 9, wherein when there is RIP image data to be stored in the cache and there is not enough space in the cache to store the RIP image data, the expansion processing part deletes, from the cache, a piece of RIP image data this is oldest in a timing at which the RIP image data was referred to by the cache.

15. The image processing apparatus according to claim 14, further comprising a data compression part which compresses the RIP image data created by the rasterize processing part, wherein the RIP image data stored in the image storage part and in the cache is compressed RIP image data compressed by the data compression part.

16. The image processing apparatus according to claim 9, further comprising a data compression part which compresses the RIP image data created by the rasterize processing part, wherein the RIP image data stored in the image storage part and in the cache is compressed RIP image data compressed by the data compression part.

\* \* \* \* \*